United States Patent
Sergeev et al.

(10) Patent No.: US 11,249,791 B2
(45) Date of Patent: Feb. 15, 2022

(54) SYSTEM AND METHOD OF SELECTIVELY RESTORING A COMPUTER SYSTEM TO AN OPERATIONAL STATE

(71) Applicant: Acronis International GmbH, Schaffhausen (CH)

(72) Inventors: Alexey Sergeev, Moscow (RU); Anton Enakiev, Moscow (RU); Vladimir Strogov, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 16/863,233

(22) Filed: Apr. 30, 2020

(65) Prior Publication Data

US 2020/0348876 A1   Nov. 5, 2020

Related U.S. Application Data

(60) Provisional application No. 62/840,513, filed on Apr. 30, 2019.

(51) Int. Cl.
| | |
|---|---|
| *G06F 12/00* | (2006.01) |
| *G06F 9/455* | (2018.01) |
| *G06F 3/06* | (2006.01) |
| *G06F 11/14* | (2006.01) |
| *G06F 11/30* | (2006.01) |

(52) U.S. Cl.
CPC ........ *G06F 9/45558* (2013.01); *G06F 3/0619* (2013.01); *G06F 3/0647* (2013.01); *G06F 3/0673* (2013.01); *G06F 11/1451* (2013.01); *G06F 11/1461* (2013.01); *G06F 11/1469* (2013.01); *G06F 11/1464* (2013.01); *G06F 11/1466* (2013.01); *G06F 11/3034* (2013.01); *G06F 2009/45575* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 2007/0294320 A1* | 12/2007 | Yueh | G06F 11/1469 |
| 2010/0262585 A1 | 10/2010 | Rosikiewicz et al. | |
| 2011/0087874 A1 | 4/2011 | Timashev et al. | |
| 2019/0286533 A1 | 9/2019 | O'Mahony et al. | |

\* cited by examiner

*Primary Examiner* — Daniel D Tsui
(74) *Attorney, Agent, or Firm* — Arent Fox LLP; Michael Fainberg (57) ABSTRACT

Disclosed herein are systems and method for selectively restoring a computer system to an operational state. In an exemplary aspect, the method may create a backup image of the computer system comprising a set of data blocks and may store the backup image of the computer system in an archive storage database. The method may determine a subset of the data blocks of the backup image that are required to keep the computer system operational. In response to determining that the computer system should be restored, the method may restore the subset of the data blocks such that the computer system is operational during startup, and may restore a remaining set of the data blocks from the backup image after the startup of the computer system.

20 Claims, 5 Drawing Sheets

SYSTEM AND METHOD OF SELECTIVELY RESTORING A COMPUTER SYSTEM TO AN OPERATIONAL STATE

CROSS-REFERENCE TO RELATED APPLICATIONS

This application claims the benefit of U.S. Provisional Application No. 62/840,513, filed Apr. 30, 2019, which is herein incorporated by reference.

FIELD OF TECHNOLOGY

The present disclosure relates generally to the field of data restoration, and more specifically, to systems and method of selectively restoring a computer system to an operational state.

BACKGROUND

Conventionally, recovery (for example, disaster recovery) of a computer system and data of the computer system is most often performed by extracting data from a previously made backup copy that contains an image of the system being restored. In many cases, during the recovery, the system must be restored to an operational state as soon as possible after the computer has crashed or a disaster has occurred. However, when restoring the system and data from a backup copy, the data blocks from the backup copy are read sequentially, e.g., in the order the data blocks were stored in the backup copy. The data restoration is not performed in the order that the data is needed for the fastest possible recovery of the system.

Furthermore, during recovery, not all data blocks stored in the archive may be needed. The search and recovery of those blocks that are needed for restoration and startup may take considerable time, however, especially if the archive is particularly large. For example, an archive as shown FIG. 1 contains a backup archive (or image) 100 of a computer, server or the like. A recovery agent starts the recovery process from the 1st block and proceeds to recover the data to the last data block, sequentially. However, for the initial recovery of the system, to boot and start the system, only a small number of blocks may need restoration, e.g., blocks 3, 7, 12 and the like. These blocks may be scattered around the archive 100 in a random order—not at the beginning of the archive 100, but in the middle, or at the end of the archive- and therefore the restoration agent may take a significantly longer time in restoring the archive.

Figure 1:
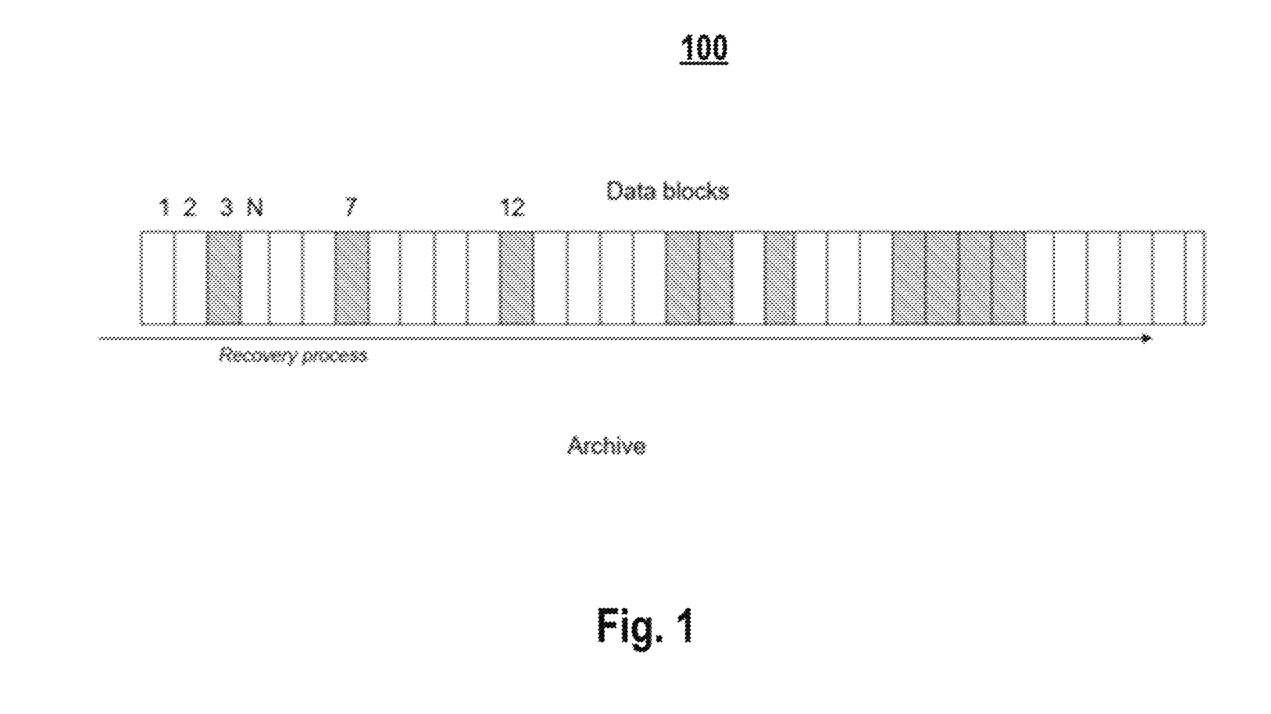
FIG. 1 is an illustration of a data archive containing a backup image of a computer or server.

Thus, the operation of the system is restored only after the entire archive 100 and all the blocks therein are restored. Only after that the system can be loaded and run. Accordingly, there is a need to reduce system restoration times during recovery.

SUMMARY

To address these shortcomings, aspects of the present disclosure describe methods and systems for selectively restoring a computer system to an operational state.

In an exemplary aspect, the method may create a backup image of the computer system comprising a set of data blocks and may store the backup image of the computer system in an archive storage database. The method may determine a subset of the data blocks of the backup image that are required to keep the computer system operational. In response to determining that the computer system should be restored, the method may restore the subset of the data blocks such that the computer system is operational during startup, and may restore a remaining set of the data blocks from the backup image after the startup of the computer system.

In some aspects, the method may determine the subset by creating and starting a virtual machine based on the backup image, monitoring data blocks accessed from the backup image during startup of the virtual machine, identifying the monitored data blocks in the subset, and placing the monitored data blocks into a persistent data cache.

In some aspects, the method may monitor the data blocks using a filter driver.

In some aspects, the monitored data blocks are requested, by a virtual disk of the virtual machine, from the backup image.

In some aspects, the method may determine the subset by detecting that the computer system has begun an initial startup, monitoring data blocks read from a disk of the computer system during the initial startup, and identifying the monitored data blocks in the subset.

In some aspects, the backup image is stored in a first type of storage of the computer system and the method may place the monitored data blocks into a second type of storage.

In some aspects, the first type of storage is cold storage and the second type of storage is hot storage, wherein data read/write speeds of the second type of storage are faster than data read/write speeds of the first type of storage.

In some aspects, the method may determine the subset by assessing a criticality of data blocks and events occurring on an initial startup of the computer system, creating a set of rules based on the assessed criticality, and applying the set of rules to the data blocks to divide the data blocks into the subset and a remaining set.

In some aspects, the method may arrange the data blocks in an order in which the data blocks are to be read during restoration, and may perform the restoring of the data blocks based on the arranging.

In some aspects, the method may determine that the computer system should be restored based on detecting at least one of: (1) a malware attack on the computer system, (2) a disaster recovery request, and (3) an event causing the computer system to crash.

In some aspects, the computer system is deemed operational when a plurality of pre-identified applications and critical data associated with the plurality of pre-identified applications is functional and accessible on the computer system.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of selectively restoring a computer system to an operational state. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In order to start a computing device or system that must be recovered as quickly as possible, data blocks that are necessary for startup should be identified as soon as possible. In the case of an emergency recovery when a fast recovery is desirable, these identified data blocks should be recovered first, without waiting for the rest of the blocks to be restored. The recovery process, therefore, may not start from the 1st block in a backup image of a machine, but in this example, from the $3^{rd}$ block, then the $7^{th}$ block, $12^{th}$ block, etc., as shown in FIG. 1. Accordingly, the blocks needed for recovery are collected and stored in a faster storage ("hot storage"), while the entire archive is stored in a relatively slower "cold storage", due to storage costs (i.e., where cold storage is cheaper than hot storage).

In exemplary aspects, cold storage is designed for long-term storage of data and particularly for archives that are not targeted for frequent access. Accordingly, cold storage prioritizes the secure storage of data while sacrificing reading and search speed of the data, thus significantly reducing the cost of cold storage. On the other hand, hot storage refers to storage that prioritizes fast access to frequently used data, capable of delivering significantly faster searches than cold storage because of higher read and/or write speeds. In particular, hot storage has minimal processing demands for speed of access and searching of data, and possibly writing of data. Therefore hot storage is significantly more costly than cold storage, and thus only stores data that must be accessed quickly, and therefore is critical for a user or a business. Hot storage may, in some aspects, refer to a local storage disk, while cold storage may refer to, in some aspects, cloud storage or the like, though aspects of the present disclosure are not limited thereto. On a more technical level, any type of storage where the time to access a data block is greater than a predetermined time threshold (e.g., 500 milliseconds), whether due to physical limitations of a disk or Internet connection speeds, may be classified as a cold storage. If the time to access is less than the predetermined time threshold, the type of storage may be classified as hot storage.

Figure 2:
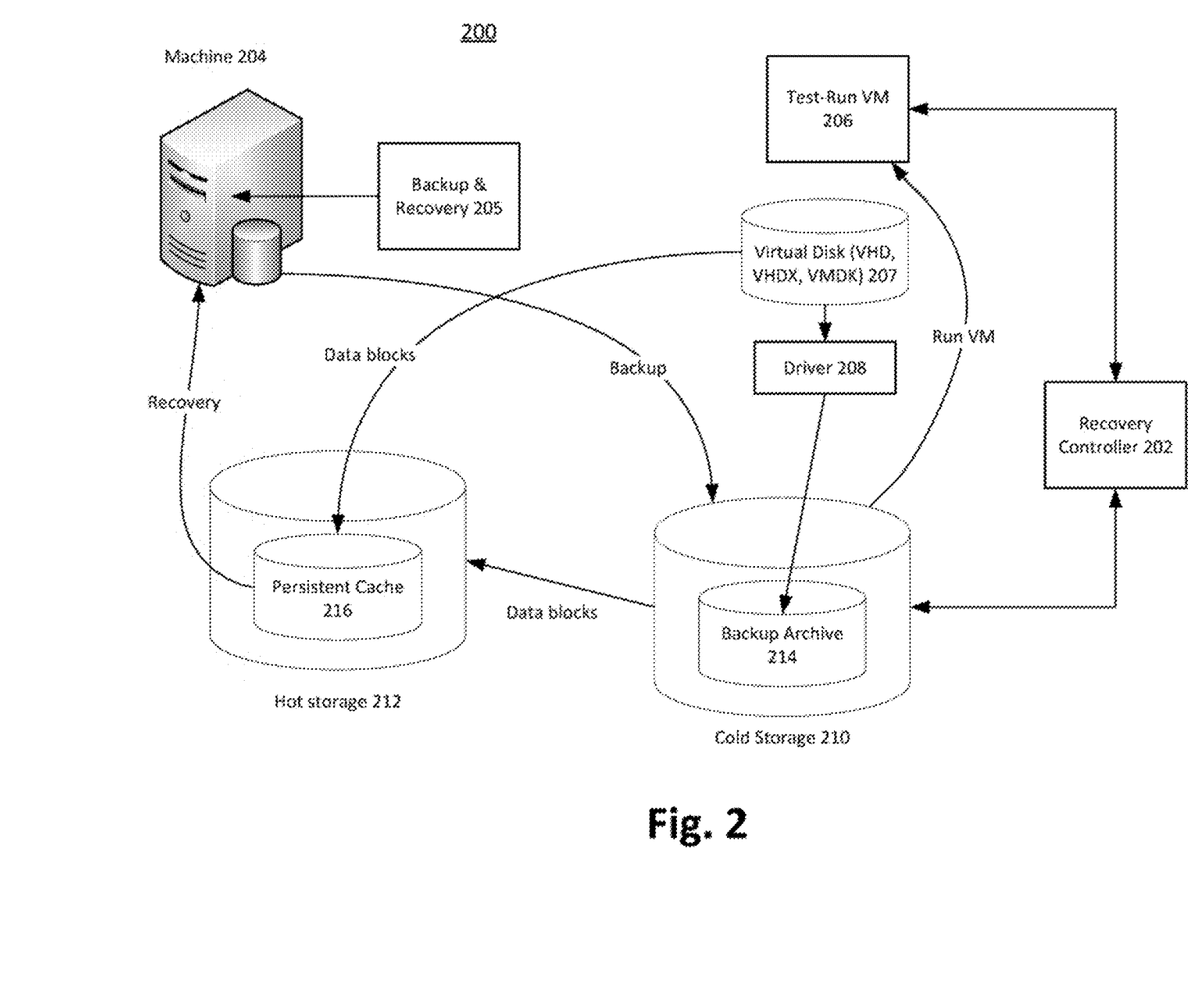
FIG. 2 is a block diagram illustrating a system of selectively restoring a computer system to an operational state, in accordance with exemplary aspects of the present disclosure.

FIG. 2 is a block diagram illustrating a system 200 of selectively restoring a computer system to an operational state, in accordance with exemplary aspects of the present disclosure.

The system 200 comprises a recovery controller 202, a machine to be recovered 204, a test run virtual machine 206, a driver 208, cold storage 210, and hot storage 212. The recovery controller 202 controls various components of the system 200 to work together to recover the machine 204 to a point where the machine 204 can be started, i.e., the operating system of the machine 204 can enter into an operational state and a user is able to use the machine 204 by first restoring those data blocks that are needed for the machine 204 to be in an operational state.

In some aspects, an operational state refers to a state when the machine can be used for any operation, or in some aspects, a portion of operations. An administrator may define what the operational state is; the operational state can be, for example, a state where the machine can be used to access installed applications and data stored on associated disks, or the like. In some aspects, an operational state indicates a state where critical data is restored, the critical data used by critical applications, as defined by an administrator and/or organizational security policy.

In exemplary aspects, the recovery controller 202 tasks a backup and recovery agent 205 to take a snapshot of the machine 204 and store the snapshot into cold storage 210. Cold storage 210 represents any data storage device that stores large amounts of data that may not be required immediately in the recovery process of a computing device (used interchangeably with "computer system"). In exemplary aspects, snapshots and full data backups of machines across a network are stored in a backup archive 214 in cold storage 210 by the backup and recovery agent 205. In some exemplary aspects, cold storage 210 may include only inactive data or data that is not required within a predetermined timeframe by a computer or an organization (e.g., the first 10 minutes of startup). In this manner, the cold storage 210 allows companies to keep inactive data offsite, and provide access to the data only when it is needed in bulk to reduce network congestion and to reduce local network storage.

After the backup and recovery agent 205 perform the tasked image backup(s) of the machines on a network, including machine 204, there may be an instance where an event occurs taking down machine 204 and/or other computing devices across the network. The machine 204 may contain company critical data, or may be a server that serves critical client requests for services or data. If the machine 204 or other machines are down, customers, business users and administrators may be unable to perform job critical functions, reducing efficiency across the organization.

Accordingly, in one aspect, to speed up recovery of the critical machine, e.g., machine 204, the recovery controller 202 determines which portions of data from the snapshot are needed to restore the machine 204 to an operational state. In this example, machine 204 may be deemed operational (used interchangeably with "being in an operational state") when a plurality of pre-identified applications and critical data associated with the plurality of pre-identified applications is functional and accessible on machine 204. For example, machine 204 may be configured to receive data and run a filter on the data to output processed data. Suppose that the filter removes empty entries in an input dataset. The filter may be an application that is manually identified by an administrator as an application that should be functional and accessible on machine 204. All data that enables the filter application to execute is thus deemed critical data, which may include operating system files to run the operating system (which in turn runs the filter application) and DLL files. It should be noted that not all data associated with a pre-identified application is in fact critical data. For example, a printing plugin on a word editor application may not be required to enable word editing functionality on the application. As a result, the plugin is not critical data. In some aspects, recovery controller 202 may identify a subset of data blocks that include the critical data and store the subset in hot storage.

In one aspect, the recovery controller 202 may maintain a list of data portions, e.g., data blocks, of a backup image or snapshot that are used when starting or restoring a computer to an operational state. In exemplary aspects the number of data portions is kept to the minimum number necessary in order to fully restore the machine 204 to an operational state. Accordingly, recovery controller 202 determines a subset of the data blocks of the backup image that are required to keep the computer system operational.

In this aspect, the administrator may set which services or functions are available on the machine 204 so that it is deemed operational. In other aspects, machine learning may be deployed to monitor the machine 204 to learn, upon startup, which data is accessed first and which data is accessed later, in addition to monitoring which portions of the data are used when starting up particular services, the order of services on startup and the like. The data may change over time, taking into account historical restore operations, updating and maintaining a new list of data that is deemed "critical" or a data block that is required to return the machine to an operational state.

In one exemplary aspect, the recovery controller 202 may start a test run virtual machine 206 with a snapshot or archive of the machine 204 saved in the backup archive 214. In this instance, the recovery controller 202 may mount a virtual disk 207 and also inject a filter or file driver 208 to monitor requests made from the test VM 206 to the virtual disk 207. In exemplary aspects, the virtual disk 207 may be VHD, VHDX, VMDK format or the like, though the present disclosure is not limited thereto. The recovery controller 202 then monitors, via the driver 208, which data blocks of the snapshot or archive are accessed during startup of the machine or up until the test VM 206 has reached an operational state, as defined by an administrator, through machine learning or the like.

In some aspects, the data blocks accessed during startup or up until the VM 206 has reached an operational state are referred to as the minimum data portions or "minimum" data blocks, in that these are the blocks that are, at a minimum, used to start up the machine 204. These data blocks are then stored as a list or any type of data structure in hot storage 212, in, for example, a persistent cache 216 that is maintained even when an event occurs that causes the network or machines on the network to crash, such as a malicious attack, a natural disaster or the like. In some exemplary aspects, the hot storage 212 is replicated and/or stored off-site in order to isolate the persistent cache 216 from attaches or disasters. In other aspects, the data blocks themselves are not stored in the persistent cache 216, but links to the data blocks in the backup archive 214 are stored in the persistent cache. Though storing the minimum data blocks in cold storage 210 will necessitate a longer recovery time to operational state, it may be desirable in some instances to save space in the hot storage 212 for data that may be more critical.

In some aspects, the recovery controller 202 may later reorder the list of data blocks in the persistent cache 216 in order of when they were accessed during startup of the computer to an operational state, to further decrease recovery times. In further aspects, the test VM can be invoked after each new scheduled backup of the machine 204. Since the data blocks can be changed or updated (removed or added), the content of persistent cache is updated each time. In exemplary aspects, the persistent cache 216 is stored on hot storage 212, for example, as a data file or a set of data files, i.e., the persistent cache 216 is stored on hard disk memory. In some other aspects however, the hot storage 212, and thus the persistent cache 216, can be in RAM, in scenarios where non-loss of the RAM is ensured, or the likelihood of this loss due to server restart, power loss, or the like is below a predetermined threshold. In this case, the persistent cache 216 can be restored from the backup archive 214.

Figure 3:
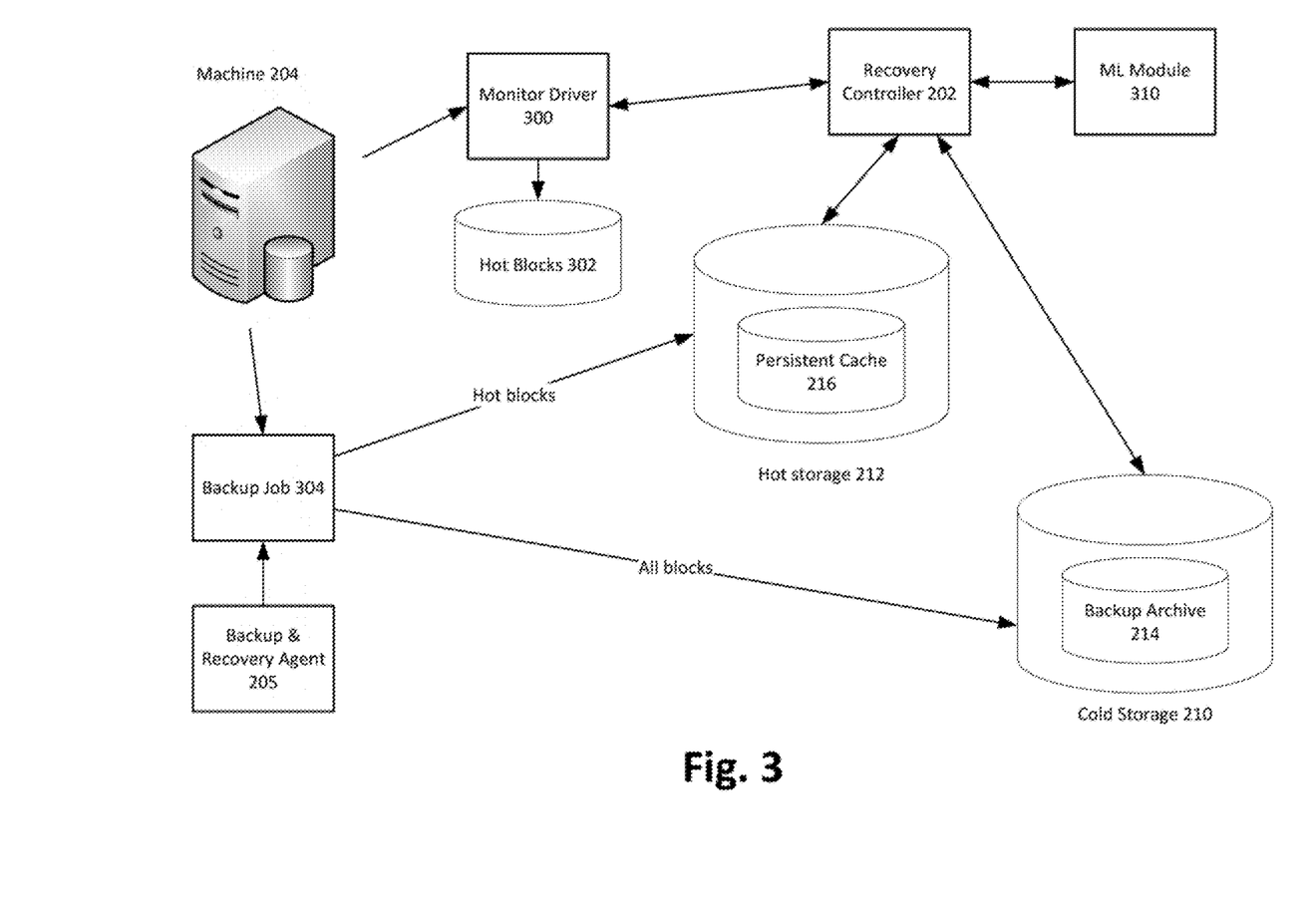
FIG. 3 is a block diagram illustrating another system of selectively restoring a computer system to an operational state, in accordance with exemplary aspects of the present disclosure.

Another aspect of the disclosure is shown in FIG. 3. In this aspect, instead of the recovery controller 202 starting a test VM 206 to determine a minimum number of data blocks, the recovery controller 202 deploys a monitoring driver 300 to monitor the startup of the machine 204 whenever it is started. As the monitoring occurs, the recovery controller 202 invokes the backup and recovery agent 205 to begin a backup job 304 to create a backup image of the machine 204 and store the backup image into a backup archive 214 of cold storage 210. The backup job 304 store the data blocks accessed during startup, i.e., the hot blocks 302, in the persistent cache 216 on the hot storage server 212, while all of the data blocks, including the minimum data blocks for restoration to an operational state, are stored in the backup archive 214 in cold storage 210. In one modification to this aspect, the recovery controller 202 only stores "cold" blocks, e.g., those data blocks that are not hot blocks 302, into cold storage 210.

In another exemplary aspect related to the aspect shown in FIG. 3, a machine learning (ML) module 310 is invoked by the recovery controller 202 that collects information and events occurring on the machine 204 and other machines on the network. In some aspects, the information and events include data about what files and other objects are requested during particular events such as computer start, launch of an application, service, or the like. Based on the collected information and events, the ML module 310 may create a set of rules on how to divide data blocks into blocks that include critical data and thus should be stored in hot storage, and blocks that can be restored subsequent to the restoration of the critical data blocks (e.g., from cold storage). In exemplary aspects, the set of rules are based on preliminary data classifications about the criticality and/or usefulness of particular data, depending on different criteria. The criteria may include data location (e.g., dedicated folders or disks), access frequency, data ownership, and the like.

For example, a rule may classify whether a given data block should be included in a subset of the plurality of data blocks or in a remaining subset of the plurality of data blocks. In some aspects, a rule may be formatted in an if-else statement. Some example rules may be (1) "if the given data block comprises a file of a pre-identified critical application, place in the subset, else place in the remaining set," (2) "if the given data block comprises a file that is included in an initial startup of the computer system, place in the subset, else place in the remaining set," (3) "if the given data block comprises a file that has been accessed in a threshold period of time prior to restoration, place in the subset, else place in the remaining set," etc.

Using either of the methods described above, the persistent cache 216 stores the hot data blocks, or the minimum data blocks needed to restore the machine 204 to an operational state. In an emergency, after a malicious attack, during disaster recovery or the like, the recovery controller 202 restores the hot blocks (e.g., the minimum data blocks) identified in the list stored in persistent cache 216 from the backup image. Subsequently, the recovery controller 202 performs a startup of the computer system with the blocks associated with restoring an operational state of the machine 204 restored. The recovery controller 202 then restores a remaining set of blocks from the backup image after the startup of the computer system.

Figure 4:
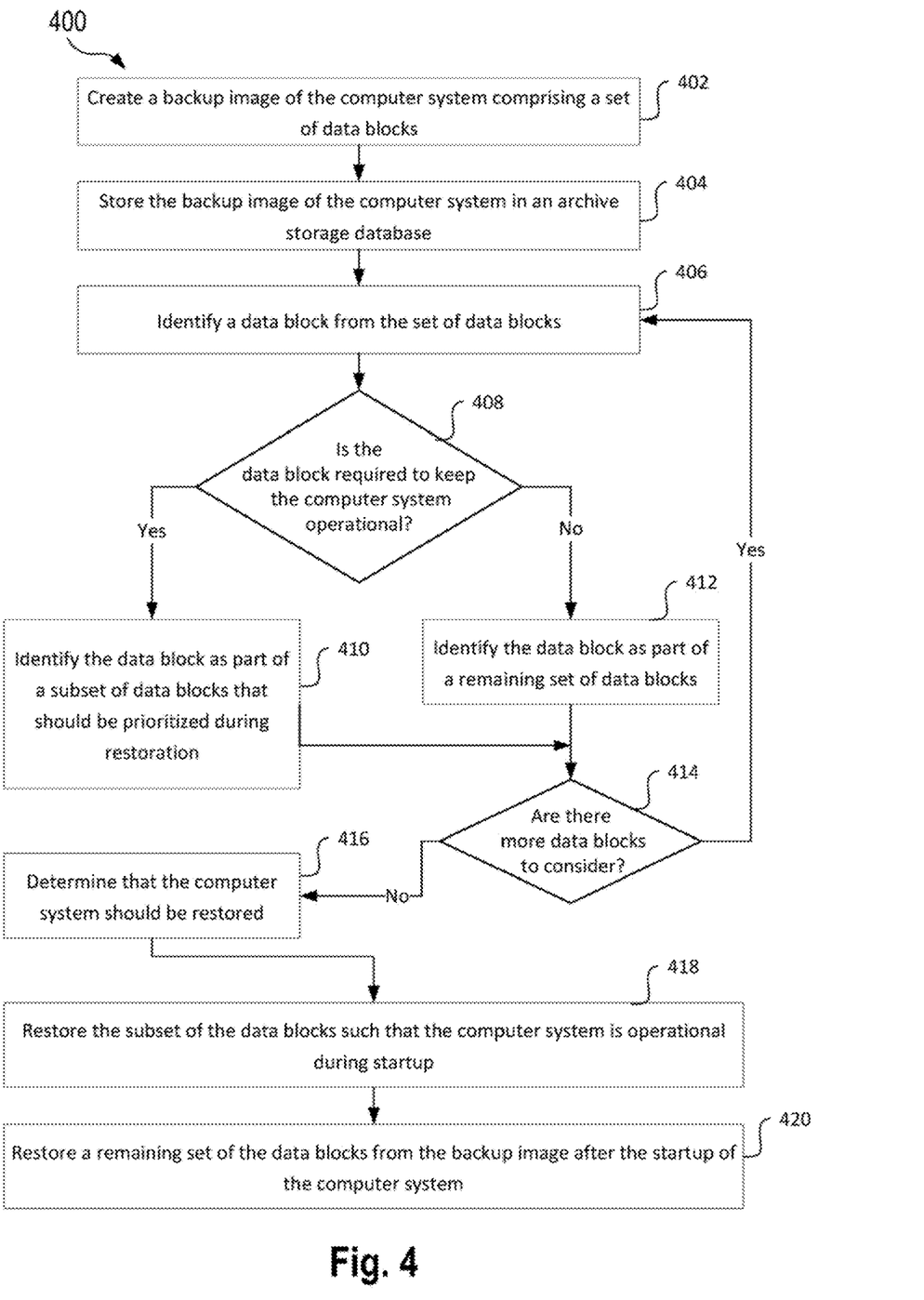
FIG. 4 is a flowchart illustrating a method of selectively restoring a computer system to an operational state, in accordance with exemplary aspects of the present disclosure.

FIG. 4 is a flowchart illustrating a method 400 of selectively restoring a computer system to an operational state, in accordance with exemplary aspects of the present disclosure.

At 402, the recovery controller 202 tasks the backup and recovery agent 205 with creating a backup image of a computer system, e.g., machine 40 shown in FIG. 2, comprising a set of data blocks.

At 404, the recovery controller 202 controls the backup and recovery agent 205 to store the backup image of the computer system to an archive storage database. In some aspects, the archive storage database is cold storage.

At 406, the recovery controller 202 identifies a data block from the set of data blocks. At 408, the recovery controller 202 determines whether the identified data block is required to keep the computer system operational. In some aspects, being operational is considered as being in an operational state after completion of startup of the computer or when a plurality of pre-identified applications and critical data associated with the plurality of pre-identified applications is functional and accessible on the computer system, as defined by machine learning or an administrator, or a combination of both.

If the absence of the data block prevents the computer system from being operational, at 410, the recovery controller 202 identifies the data block as part of a subset of data blocks that should be prioritized during restoration. In one aspect, the subset of data blocks is determined by the recovery controller 202 starting a test virtual machine and restoring the backup image to a virtual disk of the test virtual machine. A filter driver intercepts requests from the virtual hard disk to the backup image during startup to determine which data blocks are needed to restore the machine to an operational state—these data blocks are recorded and stored in the persistent cache. In alternative embodiments, the recovery control injects a monitoring driver in the machine 204, observes startup of the machine and the data blocks invoked during the startup. These invoked data blocks are determined to be "hot blocks" and are stored in persistent cache for future quick recovery.

When the virtual machine starts, the VM reads data from the virtual disk. The disk is virtualized (mounted) using a driver in a particular way so that data is read directly from the backup archive (e.g., backup archive 214). The data that has already been read (or written by the VM) are placed in the "real" virtual disk, so that there is no repeated readings from the archive. During the start of the VM, not all the data needed for further work is read. For example, the entire database is not readable by anything like Exchange or SQL. The minimum set of data is the data that the VM reads up to the point that the VM is considered in an "operational state" as defined above.

In exemplary aspects, a dedicated filter driver is used to track which sectors, data blocks or files are used during an initial startup. Using this filter driver, the files that are needed to restore a machine to an operational state (according to a predefined configuration) can be determined. The virtual test machine provides a realistic environment where such tracking can be performed.

However, if the data block is not required, the recovery controller 202 identifies the data block as part of a remaining set of data blocks (i.e., blocks that do not need to be prioritized). At 414, the recovery controller 202 determines whether there are other data blocks in the set of data blocks to consider (that have not been assessed at 408). If there are other data blocks to a consider, method 400 returns to 406 and another data block is selected. The loop between 406 and 414 may continue until all data blocks in the set have been classified.

In some aspects, subsequent to classifying each data block, the recovery controller 202 may store the subset of data blocks in persistent cache 216 and keep the remaining set of data blocks in cold storage (e.g., a hard drive).

At 416, the recovery controller 202 determines that the computer system should be restored. In some aspects, the determination that the computer system should be restored is based on detecting at least one of: (1) a malware attack on the computer system, (2) a disaster recovery request, and (3) an event causing the computer system to crash.

At 418, the recovery controller 202 restores the subset of the data blocks such that the computer system is operational during startup.

At 420, the recovery controller 202 restores a remaining set of data blocks from the backup image after the startup of the computer system. In exemplary aspects, the recovery controller 202 accesses the cold storage to retrieve the entire backup image, and then compares the blocks of the image to blocks in the persistent cache. If the blocks are contained in the persistent cache 216, the block is ignored (as it already has been restored in 418), and only those blocks not found in the persistent cache are restored to the computer system.

Figure 5:
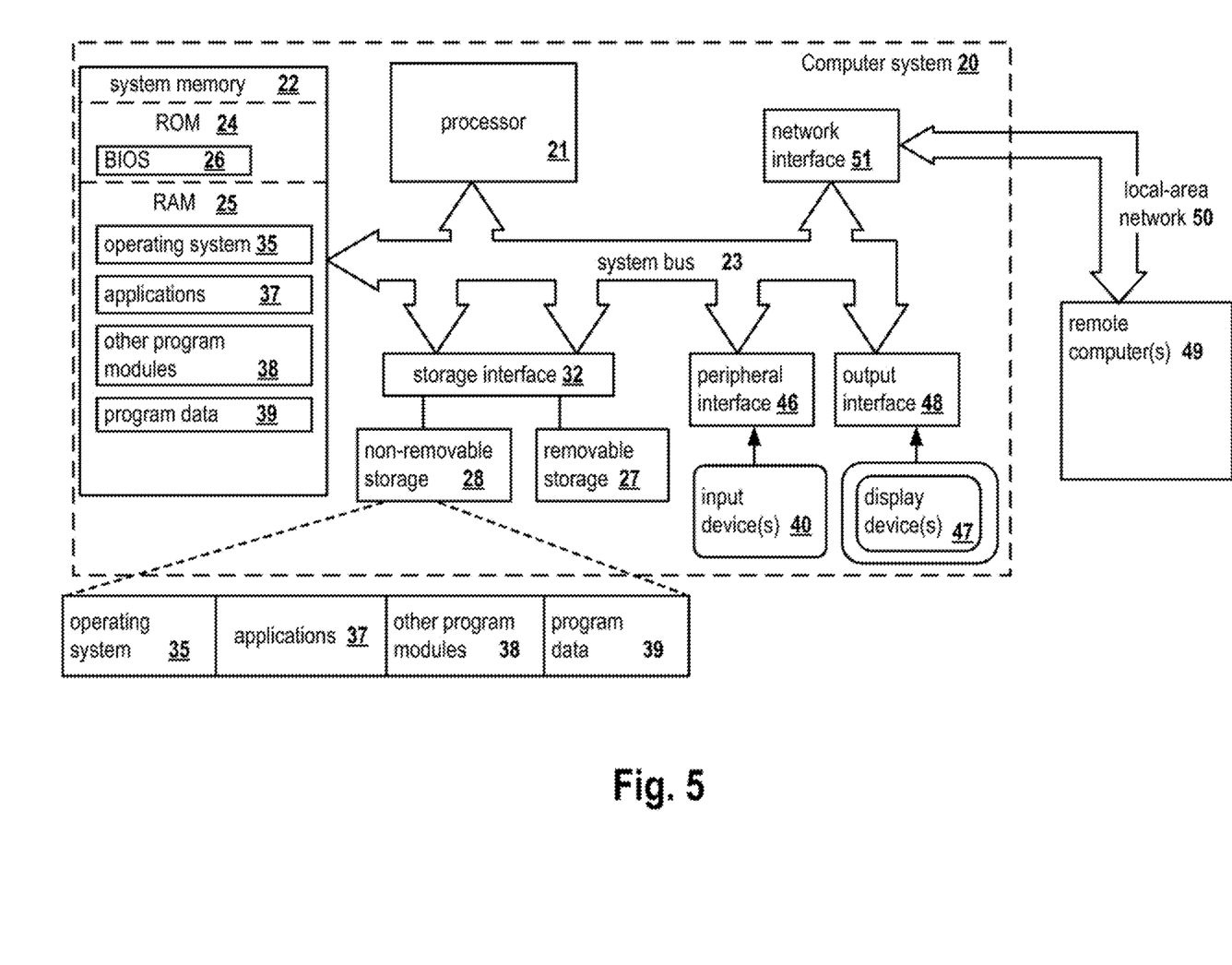
FIG. 5 is a block diagram of a computer system on which the disclosed system and method can be implemented according to an exemplary aspect.

FIG. 5 is a block diagram illustrating a computer system 20 on which aspects of systems and methods of selectively restoring a computer system to an operational state may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of selectively restoring a computer system to an operational state, comprising:
 creating a backup image of the computer system comprising a set of data blocks;
 storing the backup image of the computer system in an archive storage database;
 determining a subset of the data blocks of the backup image that are required to keep the computer system operational by:
  creating and starting a virtual machine based on the backup image;
  monitoring data blocks accessed from the backup image during startup of the virtual machine; and
  identifying the monitored data blocks as part of the subset;
 in response to determining that the computer system should be restored:
  restoring the subset of the data blocks such that the computer system is operational during startup; and
  restoring a remaining set of the data blocks from the backup image after the startup of the computer system.

2. The method of claim 1, further comprising:
 placing the monitored data blocks into a persistent data cache.

3. The method of claim 2, monitoring the data blocks using a filter driver.

4. The method of claim 2, wherein the monitored data blocks are requested, by a virtual disk of the virtual machine, from the backup image.

5. The method of claim 1, wherein determining the subset comprises:
 detecting that the computer system has begun an initial startup;
 monitoring data blocks read from a disk of the computer system during the initial startup; and
 identifying the monitored data blocks from the disk as part of the subset.

6. The method of claim 5, wherein the backup image is stored in a first type of storage of the computer system, further comprising:
 placing the monitored data blocks from the disk into a second type of storage.

7. The method of claim 6, wherein the first type of storage is cold storage and the second type of storage is hot storage, and wherein data read/write speeds of the second type of storage are faster than data read/write speeds of the first type of storage.

8. The method of claim 1, wherein determining the subset further comprises:
 assessing a criticality of data blocks and events occurring on an initial startup of the computer system;
 creating a set of rules based on the assessed criticality;
 applying the set of rules to the data blocks to divide the data blocks into the subset and a remaining set.

9. The method of claim 1, further comprising:
 arranging the data blocks in an order in which the data blocks are to be read during restoration; and
 performing the restoring of the data blocks based on the arranging.

10. The method of claim 1, wherein determining that the backup image should be restored is based on detecting at least one of: (1) a malware attack on the computer system, (2) a disaster recovery request, and (3) an event causing the computer system to crash.

11. The method of claim 1, wherein the computer system is deemed operational when a plurality of pre-identified applications and critical data associated with the plurality of pre-identified applications is functional and accessible on the computer system.

12. A system of selectively restoring a computer system to an operational state, comprising: a hardware processor configured to:
 create a backup image of the computer system comprising a set of data blocks;
 store the backup image of the computer system in an archive storage database;
 determine a subset of the data blocks of the backup image that are required to keep the computer system operational by:
  creating and starting a virtual machine based on the backup image;

monitoring data blocks accessed from the backup image during startup of the virtual machine; and
identifying the monitored data blocks as part of the subset;
in response to determining that the computer system should be restored:
restore the subset of the data blocks such that the computer system is operational during startup; and
restore a remaining set of the data blocks from the backup image after the startup of the computer system.

13. The system of claim 12, wherein the hardware processor is configured to:
place the monitored data blocks into a persistent data cache.

14. The system of claim 13, wherein the hardware processor is configured to monitor the data blocks using a filter driver.

15. The system of claim 13, wherein the monitored data blocks are requested, by a virtual disk of the virtual machine, from the backup image.

16. The system of claim 12, wherein the hardware processor is configured to determine the subset by:
detecting that the computer system has begun an initial startup;
monitoring data blocks read from a disk of the computer system during the initial startup; and
identifying the monitored data blocks from the disk as part of the subset.

17. The system of claim 16, wherein the backup image is stored in a first type of storage of the computer system, wherein the hardware processor is further configured to:
place the monitored data blocks from the disk into a second type of storage.

18. The system of claim 17, wherein the first type of storage is cold storage and the second type of storage is hot storage, and wherein data read/write speeds of the second type of storage are faster than data read/write speeds of the first type of storage.

19. The system of claim 12, wherein the hardware processor is further configured to determine the subset by:
assessing a criticality of data blocks and events occurring on an initial startup of the computer system;
creating a set of rules based on the assessed criticality;
applying the set of rules to the data blocks to divide the data blocks into the subset and a remaining set.

20. A non-transitory computer readable medium storing thereon computer executable instructions for selectively restoring a computer system to an operational state, including instructions for:
creating a backup image of the computer system comprising a set of data blocks;
storing the backup image of the computer system in an archive storage database;
determining a subset of the data blocks of the backup image that are required to keep the computer system operational by:
creating and starting a virtual machine based on the backup image;
monitoring data blocks accessed from the backup image during startup of the virtual machine; and
identifying the monitored data blocks as part of the subset;
in response to determining that the computer system should be restored:
restoring the subset of the data blocks such that the computer system is operational during startup; and
restoring a remaining set of the data blocks from the backup image after the startup of the computer system.

* * * * *